US006993995B2

(12) United States Patent
Fujii

(10) Patent No.: US 6,993,995 B2
(45) Date of Patent: Feb. 7, 2006

(54) SHIFT POSITIONING DEVICE FOR A BICYCLE TRANSMISSION

(75) Inventor: Kazuhiro Fujii, Kawachinagano (JP)

(73) Assignee: Shimano, Inc., Sakai (JP)

( * ) Notice: Subject to any disclaimer, the term of this patent is extended or adjusted under 35 U.S.C. 154(b) by 30 days.

(21) Appl. No.: 10/210,434

(22) Filed: Jul. 31, 2002

(65) Prior Publication Data

US 2003/0024339 A1 Feb. 6, 2003

(30) Foreign Application Priority Data

Aug. 1, 2001 (JP) ............................ 2001-234002

(51) Int. Cl.
*F16C 1/12* (2006.01)
(52) U.S. Cl. ...................... 74/502.2; 74/489; 74/501.6
(58) Field of Classification Search .................. 74/575, 74/577 R, 577 S, 527, 530, 501.6, 502.2, 74/489
See application file for complete search history.

(56) References Cited

U.S. PATENT DOCUMENTS

| | | | | |
|---|---|---|---|---|
| 4,768,395 A | * | 9/1988 | Tagawa ...................... 74/502.2 |
| 5,095,768 A | * | 3/1992 | Nagano .................... 74/473.14 |
| 5,356,349 A | | 10/1994 | Browning |
| 5,514,041 A | * | 5/1996 | Hsu ............................. 474/78 |
| 5,540,456 A | | 7/1996 | Meier-Burkamp et al. |
| 5,590,564 A | * | 1/1997 | Kishimoto ................. 74/502.2 |
| 5,676,022 A | * | 10/1997 | Ose ........................... 74/502.2 |
| 5,681,234 A | * | 10/1997 | Ethington ..................... 474/70 |
| 5,768,945 A | * | 6/1998 | Ose ........................... 74/502.2 |
| 6,012,351 A | | 1/2000 | Ysker |
| 6,047,230 A | | 4/2000 | Spencer et al. |
| 6,868,752 B2 | * | 3/2005 | Tetsuka et al. ............ 74/502.2 |
| 2005/0241430 A1 | * | 11/2005 | Kawakami ................. 74/502.2 |

FOREIGN PATENT DOCUMENTS

| JP | 5-77774 | 3/1993 |
|---|---|---|
| JP | 8-175460 | 7/1996 |
| JP | 11-70863 | 3/1999 |

* cited by examiner

*Primary Examiner*—Vinh T. Luong
(74) *Attorney, Agent, or Firm*—James A. Deland

(57) ABSTRACT

A bicycle shift positioning device includes a base member adapted to be mounted to a bicycle; a first rotating body rotatably mounted relative to the base member; a second rotating body rotatably mounted relative to the first rotating body; a positioning member coupled to the base member and having a plurality of positioning elements; a pawl coupled for movement with the first rotating body, wherein the pawl moves between a positioning member engaging position and a positioning member disengaging position; a pawl control member coupled for movement with the second rotating body; and a pawl biasing mechanism for biasing the pawl toward the positioning member engaging position. The pawl control member allows the pawl to move toward the positioning member engaging position when the first rotating body is in a first rotational position relative to the second rotating body, and the pawl control member causes the pawl to be in the positioning member disengaging position when the first rotating body is in a second rotational position relative to the second rotating body.

26 Claims, 16 Drawing Sheets

MODE 1

| | Speed 1 | Speed 2 | Speed 3 |
|---|---|---|---|
| UPSHIFT THRESHOLD (km/h) | 19.2 | 26.0 | |
| DOWNSHIFT THRESHOLD (km/h) | | 17.5 | 23.8 |

MODE 2

| | Speed 1 | Speed 2 | Speed 3 |
|---|---|---|---|
| UPSHIFT THRESHOLD (km/h) | 16.7 | 22.6 | |
| DOWNSHIFT THRESHOLD (km/h) | | 15.2 | 20.7 |

MODE 3

| | Speed 1 | Speed 2 | Speed 3 |
|---|---|---|---|
| UPSHIFT THRESHOLD (km/h) | 14.6 | 19.7 | |
| DOWNSHIFT THRESHOLD (km/h) | | 13.2 | 18.0 |

MODE 4

| | Speed 1 | Speed 2 | Speed 3 |
|---|---|---|---|
| UPSHIFT THRESHOLD (km/h) | 12.7 | 17.1 | |
| DOWNSHIFT THRESHOLD (km/h) | | 11.5 | 15.6 |

MODE 5

| | Speed 1 | Speed 2 | Speed 3 |
|---|---|---|---|
| UPSHIFT THRESHOLD (km/h) | 11.0 | 14.9 | |
| DOWNSHIFT THRESHOLD (km/h) | | 10.0 | 13.6 |

MODE 6

| | Speed 1 | Speed 2 | Speed 3 |
|---|---|---|---|
| UPSHIFT THRESHOLD (km/h) | 9.6 | 12.9 | |
| DOWNSHIFT THRESHOLD (km/h) | | 8.7 | 11.8 |

MODE 7

| | Speed 1 | Speed 2 | Speed 3 |
|---|---|---|---|
| UPSHIFT THRESHOLD (km/h) | 8.3 | 11.2 | |
| DOWNSHIFT THRESHOLD (km/h) | | 7.6 | 10.3 |

Fig. 12

SHIFT POSITIONING DEVICE FOR A BICYCLE TRANSMISSION

BACKGROUND OF THE INVENTION

The present invention is directed to bicycles and, more particularly, to a shift positioning device for positioning the actuating member of a bicycle transmission.

Bicycle transmissions include internal transmissions and external transmissions. Internal transmissions ordinarily include a planetary gear mechanism fitted in the rear wheel hub. External transmissions ordinarily have a multiple sprocket cassette mounted on the rear wheel hub or crank, and a derailleur guides a chain among the multiple sprockets. In either case, a shift control cable is connected to the transmission and to a shift control device mounted to the bicycle frame. In the past, the rider would operate the shift control device to select a desired transmission gear.

Recently, automatic bicycle transmissions have been developed which automatically shift the transmission to higher gear ratios when the bicycle is traveling at high speeds and which automatically shift the transmission to lower gear ratios when the bicycle is traveling at low speeds. Such automatic transmissions usually are equipped with an electric motor for operating the shift control cable, a speed sensor for sensing bicycle speed, a shift control device containing a microcomputer for controlling the electric motor in response to bicycle speed, and a case mounted to the bicycle frame for containing these components.

A shift positioning device for a known shift control device has a base member disposed inside the case, a winding body rotatably coupled to the base member for winding the shift control cable, a positioning member retained to the winding body and allowed to move in the axial direction, a releasing member disposed adjacent to the positioning member and rotatably mounted on the base member, an electric motor, and a gear reduction mechanism for stepping down the revolutions of the electric motor and transmitting them to the releasing member. The positioning member is biased axially against the releasing member by a biasing member. The releasing member is ultimately connected to the winding body while allowed to have a specific play in the direction of rotation.

The positioning member and the base member have mating surfaces facing each other in the axial direction and form a positioning mechanism for positioning the positioning member according to the speed steps. The positioning member and the releasing member also have mating surfaces facing each other in the axial direction to form a unidirectional interlocking mechanism so that the positioning member, the releasing member and the winding body rotate as a unit when the releasing member rotates in the winding direction of the shift control cable. The unidirectional interlocking mechanism also releases the positioning member from its current position when the releasing member rotates in the unwinding direction of the shift control cable so that the winding body moves in the unwinding direction of the shift control cable. The unidirectional interlocking mechanism and the positioning mechanism both comprise a plurality of right-triangular cam surfaces slanted in opposite directions, and they are formed such that the cam surfaces of the unidirectional interlocking mechanism are higher than the cam surfaces of the positioning mechanism.

When the releasing member is rotated in the cable winding direction by the electric motor in a mechanism thus configured, the releasing member rotates the positioning member and causes the cam surfaces of the positioning mechanism of the positioning member to travel over the cam surfaces of the positioning mechanism of the base member. Thereafter, the cam surfaces of the positioning mechanism of the positioning member again engage the cam surfaces of the positioning mechanism of the base member, but this time the positioning member and therefore the winding body have rotated the equivalent of one speed step in the cable pulling direction. The shift control cable is likewise pulled the equivalent of one speed step.

When the releasing member is rotated in the cable unwinding direction, the positioning member is moved in the axial direction by the cam surfaces of the unidirectional interlocking mechanism, and the positioning member is released from the base member because the cam surfaces of the unidirectional interlocking mechanism are higher than the cam surfaces of the positioning mechanism. Thereafter, the cam surfaces of the positioning mechanism of the positioning member again engage the cam surfaces of the positioning mechanism of the base member, but this time the positioning member and therefore the winding body have rotated the equivalent of one speed step in the cable unwinding direction. The shift control cable is likewise released the equivalent of one speed step.

In such devices, the position of the winding member is controlled by axial movement of a positioning member relative to a releasing member, and a biasing mechanism must be provided for biasing the positioning member and the releasing member towards each other. Accordingly, a space must be provided to accommodate such axial movement as well as the biasing mechanism. This makes it difficult to produce an axially compact device.

SUMMARY OF THE INVENTION

The present invention is directed to a shift positioning device for a bicycle transmission which allows the device to be constructed more compactly than known devices. In one embodiment of the present invention, a bicycle shift positioning device includes a base member adapted to be mounted to a bicycle; a first rotating body rotatably mounted relative to the base member; a second rotating body rotatably mounted relative to the first rotating body; a positioning member coupled to the base member and having a plurality of positioning elements; a pawl coupled for movement with the first rotating body, wherein the pawl moves between a positioning member engaging position and a positioning member disengaging position; a pawl control member coupled for movement with the second rotating body; and a pawl biasing mechanism for biasing the pawl toward the positioning member engaging position. The pawl control member allows the pawl to move toward the positioning member engaging position when the first rotating body is in a first rotational position relative to the second rotating body, and the pawl control member causes the pawl to be in the positioning member disengaging position when the first rotating body is in a second rotational position relative to the second rotating body.

BRIEF DESCRIPTION OF THE DRAWINGS

FIG. 12 is a series of tables showing the shifting characteristics for various automatic shifting modes;

DETAILED DESCRIPTION OF THE EMBODIMENTS

Figure 1:
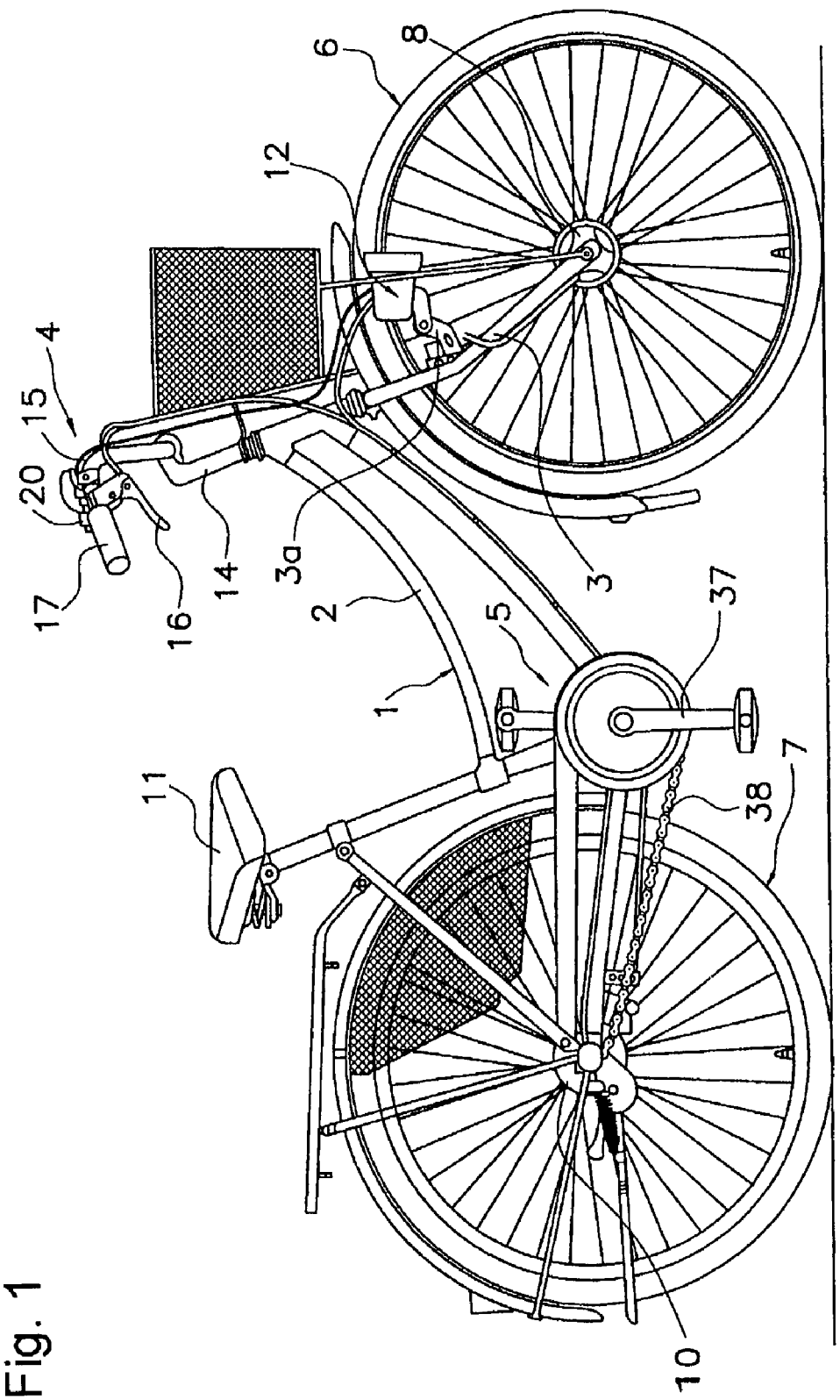
FIG. 1 is a side view of a bicycle that includes a particular embodiment of a bicycle transmission according to the present invention.

FIG. 1 is a side view of a bicycle that includes a particular embodiment of an electronic bicycle transmission according to the present invention. This bicycle is a recreational bicycle comprising a frame 1 having a double-loop frame body 2 formed from welded tubes, a front fork 3 rotatably mounted to the frame body 2, a handle component 4, a drive component 5, a front wheel 6 on which a dynamo hub 8 with brakes is mounted, a rear wheel 7 on which an internal shifting hub 10 is mounted, a saddle 11, a shift control unit 12 to control shifting of the internal shifting hub 10, and a shift controller 20 for manually operating the shift control unit 12.

Figure 2:
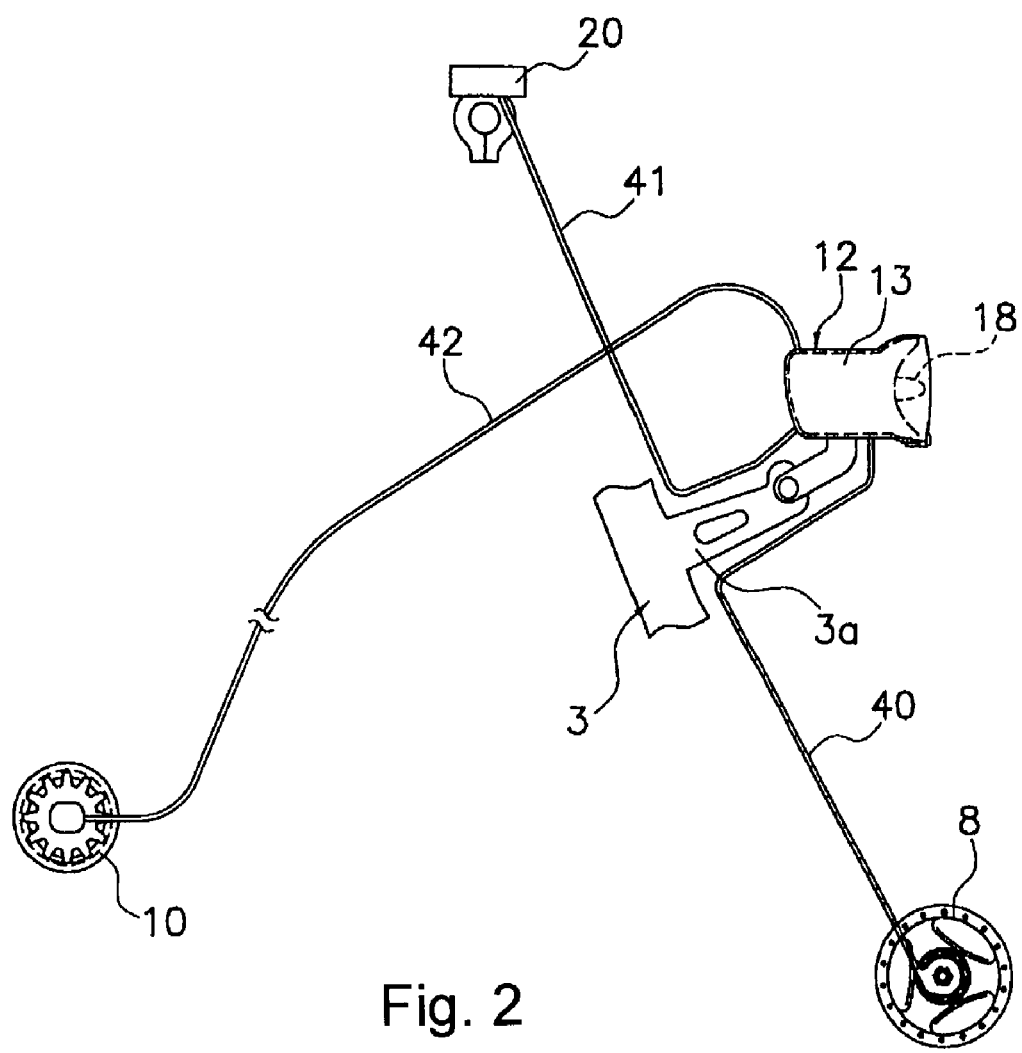
FIG. 2 illustrates how a shift controller, a shift control unit, a generator and a transmission are coupled together.

The handle component 4 comprises a handle stem 14, fastened to the upper part of the front fork 3, and a handlebar 15 fastened to the handle stem 14. Brake levers 16 and grips 17 are mounted on both ends of the handlebar 15. In this embodiment, the shift controller 20 is integrated with the right-side brake lever 16. The drive component 5 comprises a crank 37, mounted on the lower part (bottom bracket component) of the frame body 2, and a chain 38 that engages the crank 37 and the internal shifting hub 10. The internal shifting hub 10 is capable of producing three speed steps, including a low speed step (speed 1), an intermediate speed step (speed 2), and a high speed step (speed 3). These three speed steps can be selected by means of a positioning unit 29 (FIG. 3) in the shift control unit 12. The dynamo hub 8 of the front wheel 6 can be fitted with a roller-type front brake, and it houses an alternating current generator 19 (FIG. 14) that generates electricity in response to the rotation of the front wheel 6. As shown in FIG. 2, the shift control unit 12 is electrically connected to the alternating current generator 19 housed in the dynamo hub 8 by electrical wiring 40, and it is electrically connected to the shift controller 20 by electrical wiring 41. The shift control unit 12 is mechanically connected to the internal shifting hub 10 by a shift control cable 42.

Figure 3:
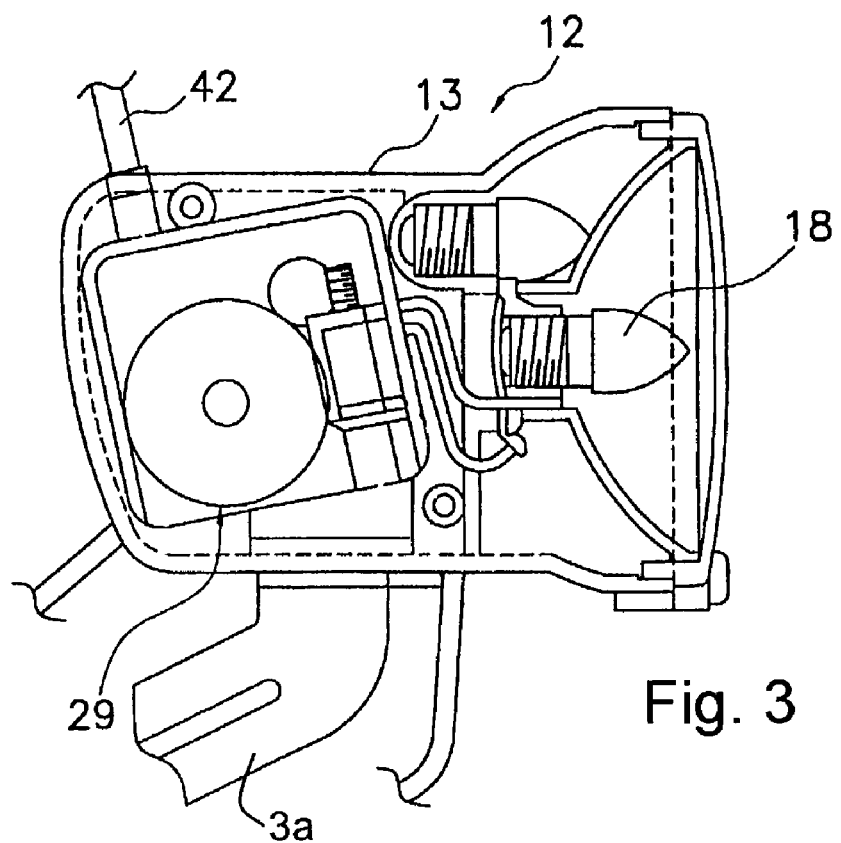
FIG. 3 is a side cross sectional view of the shift control unit shown in FIG. 2.
Figure 4:
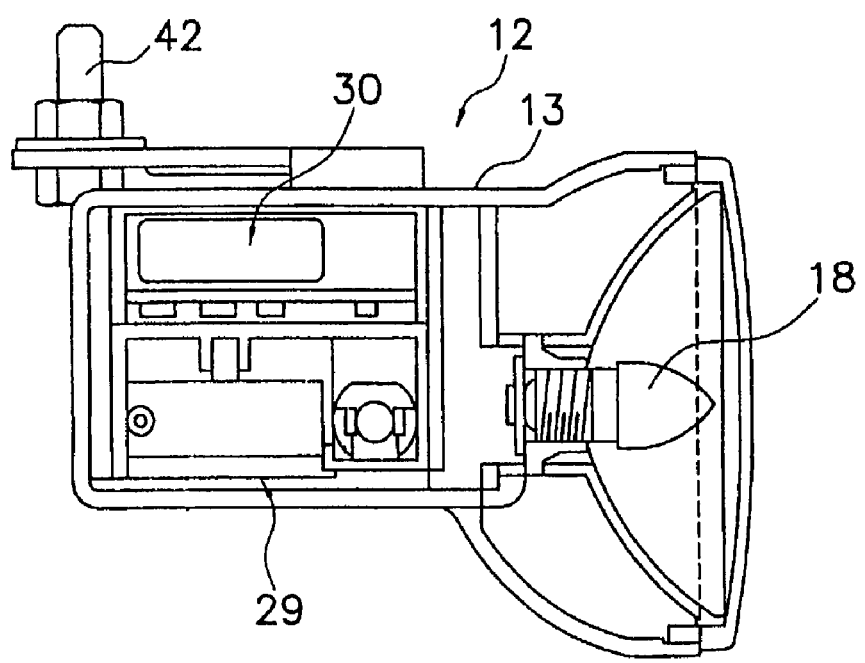
FIG. 4 is a top cross sectional view of the shift control unit shown in FIG. 2.
Figure 5:
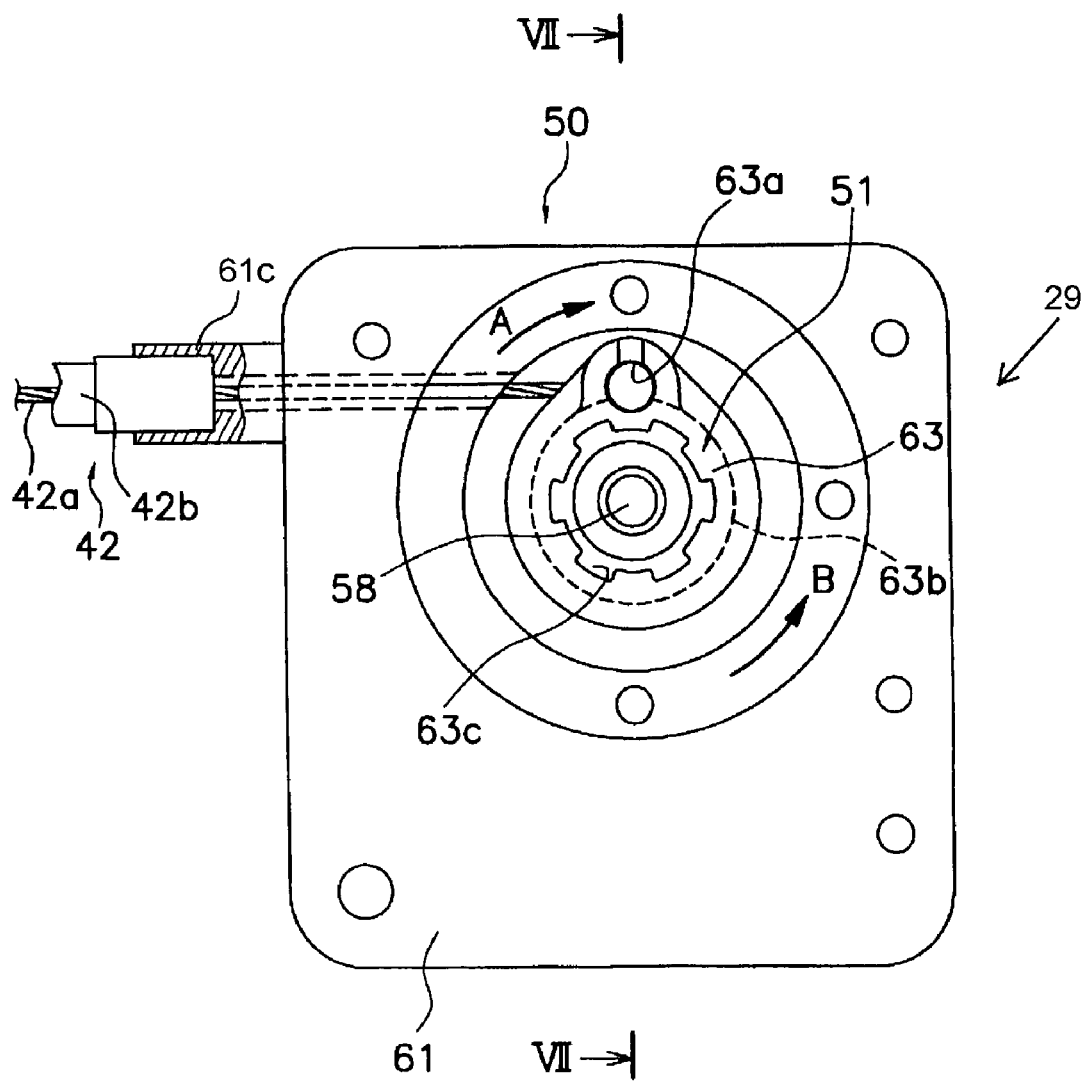
FIG. 5 is a cutaway view of a positioning unit.

As shown in FIGS. 3 and 4, the shift control unit 12 comprises a lamp case 13 mounted to a lamp stay 3a located midway along the front fork 3 for housing a lamp 18. The positioning unit 29 and a circuit unit 30 are housed in the lamp case 13. The circuit unit 30 comprises a shift control element 25 (FIG. 12) containing a microcomputer comprising a CPU, RAM, ROM, and an I/O interface.

As shown in FIGS. 5–8, the positioning unit 29 has a case 50; a first rotating body in the form of a winding body 51 rotatably mounted around a spindle 58; a positioning member 52 fixed on the case 50; a pawl member 53 mounted on the winding body 51 for rotating between a positioning member engaging (locked) position and positioning member disengaging (separated) position; a circular spring member 54 for biasing the pawl member 53 toward the positioning member engaging position; a second rotating body in the form of a pawl control member 55 rotatably mounted around spindle 58 for controlling the movement of pawl member 53 between the positioning member engaging position and the positioning member disengaging position; a position detector 56 for detecting the position of pawl control member 55; and an electric drive mechanism 57 for driving the pawl control member 55.

The case 50 can be mounted on the bicycle by means of the lamp case 13. The case 50 contains a first case member 60, a second case member 61 to which the first case member 60 is threadably attached, and a cover member 62 threadably attached to the second case member 61. The first case member 60 defines an open-sided first rectangular storage space 60a with a boss component 60b formed on the bottom. One end of spindle 58 is nonrotatably fixed to this boss component 60b, and the other end of spindle 58 is supported by the cover member 62. The second case member 61 covers the first storage space 60a of the first case member 60 and forms a cylindrical second storage space 61a. A circular aperture 61b, defining a passage through to the first storage space 60a, is formed in the middle of the second storage space 61a. An outer locking member 61c (FIG. 5), to which an outer casing 42b of the shift control cable 42 is attached, is formed to extend out of the side of the second case member 61. An electric motor 70 of the electric drive mechanism 57 is mounted in a manner that straddles the first case member 60 and the second case member 61.

The winding body 51 comprises a cable winding member 63 disposed in the second storage space 61a and a pawl mounting member 64 disposed in the first storage space 60a. A spline groove 63c formed on an inner peripheral surface of cable winding member 63 engages a complementary spline groove 64e formed on an outer peripheral surface of a spindle 64c of pawl mounting member 64 to nonrotatably couple cable winding member 63 to pawl mounting member 64.

The cable winding member 63 comprises, for example, a plastic raindrop-shaped cylindrical member having a cable locking member 63a in the form of a cylindrical aperture. Cable locking member 63a locks a cable end bead 42c attached to the end of inner cable 42a of the shift control cable 42. A cable winding groove 63b, around which the inner cable 42a is wound, is formed on the outer peripheral surface of the cable winding member 63.

The pawl mounting member 64 is a metal cylindrical member having a large-diameter portion 64b and spindle 64c. Large diameter portion 64b has an outer peripheral surface that defines a generally cylindrical pawl supporting element 64a for rotatably accommodating pawl member 53. A circular groove 64d, in which the spring 54 is mounted, also is formed on the outer peripheral surface of the large-diameter portion 64b. An interlocking pin 64h (FIG. 7) extends from the large diameter portion 64b and into an opening 55c in pawl control member 55 for interlocking pawl mounting member 64 (and hence cable winding member 63) with pawl control member 55. The spindle 64c extends through the aperture 61b in second case member 61 and mates with cable winding member 63 as noted above. A waterproofing O-ring 59a is disposed between a circular groove 64f formed on the external peripheral surface of spindle 64c and the surface forming aperture 61b. Another waterproofing O-ring 59b is disposed between another circular groove 64g formed on the outer peripheral surface of spindle 64c and spindle 58. O-ring 59a prevents the flow of liquid from the second storage space 61a into the first storage space 60a, and the O-ring 59b prevents the flow of liquid from the exterior into the first storage space 60a.

In this embodiment, positioning member 52 is used for positioning winding body 51, and hence inner cable 42a of shift control cable 42, at three speed step positions via the pawl member 53. The positioning member 52 is a substantially rectangular metal plate member having a generally circular positioning aperture 52a. In this embodiment, the positioning aperture 52a extends through (is cut out at) the corner of the positioning member 52. This is done to avoid interference with other structural components, and there is no need to cut out the corner in the absence of interference. Three positioning elements in the form of protrusions 52b, 52c, and 52d extend radially inwardly from the inner peripheral surface of the positioning aperture 52a and are placed at regular intervals in the circumferential (rotational) direction to accommodate the desired positioning of inner cable 42a of shift control cable 42. The protrusion 52b is positioned at the front of the cable winding direction A, the protrusion 52c is positioned in the middle of cable winding direction A, and the protrusion 52d is positioned at the end of cable winding direction A. A typical internal shifter hub 10 with three speed steps is in a low speed position without pulling the shifter cable 42, and the hub 10 shifts to the middle and high speed positions by pulling inner cable 42a of shift control cable 42. Thus, the protrusion 52b accommodates the low speed step, the protrusion 52c accommodates the middle speed step, and the protrusion 52d accommodates the high speed step. Of course, the number of protrusions depends upon the number of speed steps and may include, for example, 7–9 (or more) protrusions to accommodate modem hubs.

Pawl member 53 is a metal member that rotates between a positioning member engaging position, wherein the tip 53b of pawl 53 protrudes radially outwardly for engaging any one of the three protrusions 52b–52d, and a positioning member disengaging position, wherein the tip 53b of pawl 53 is disposed radially inwardly and is disengaged from any of the three protrusions 52b–52d. Pawl member 53 includes a groove 53c for receiving spring 54 therein in a well known manner such that pawl 53 is biased toward the positioning member engaging position. The positioning member disengaging position allows the winding body 51 to rotate in the cable unwinding direction B, but the positioning member engaging position inhibits or prevents the winding body 51 from rotating in the cable unwinding direction B. On the other hand, the positioning member engaging position does not prevent winding body 51 from rotating in the cable winding direction A. More specifically, pawl member 53 is rotatably mounted in the pawl supporting element 64a of pawl mounting member 64, and the rotational center 53a (FIG. 6) of pawl 53 is placed downstream of the tip 53b in the cable winding direction A. This allows the tip 53b of pawl member 53 to move radially inwardly into the positioning member disengaging position when winding member 51 rotates in the cable winding direction A and the tip 53b of pawl member 53 contacts the protrusion 52b. Conversely, when the winding member 51 rotates in the cable unwinding direction B and pawl 53 is in the positioning member engaging position, the tip 53b of pawl 53 engages the protrusion 52b and prevents winding body 51 from rotating further.

Figure 8:
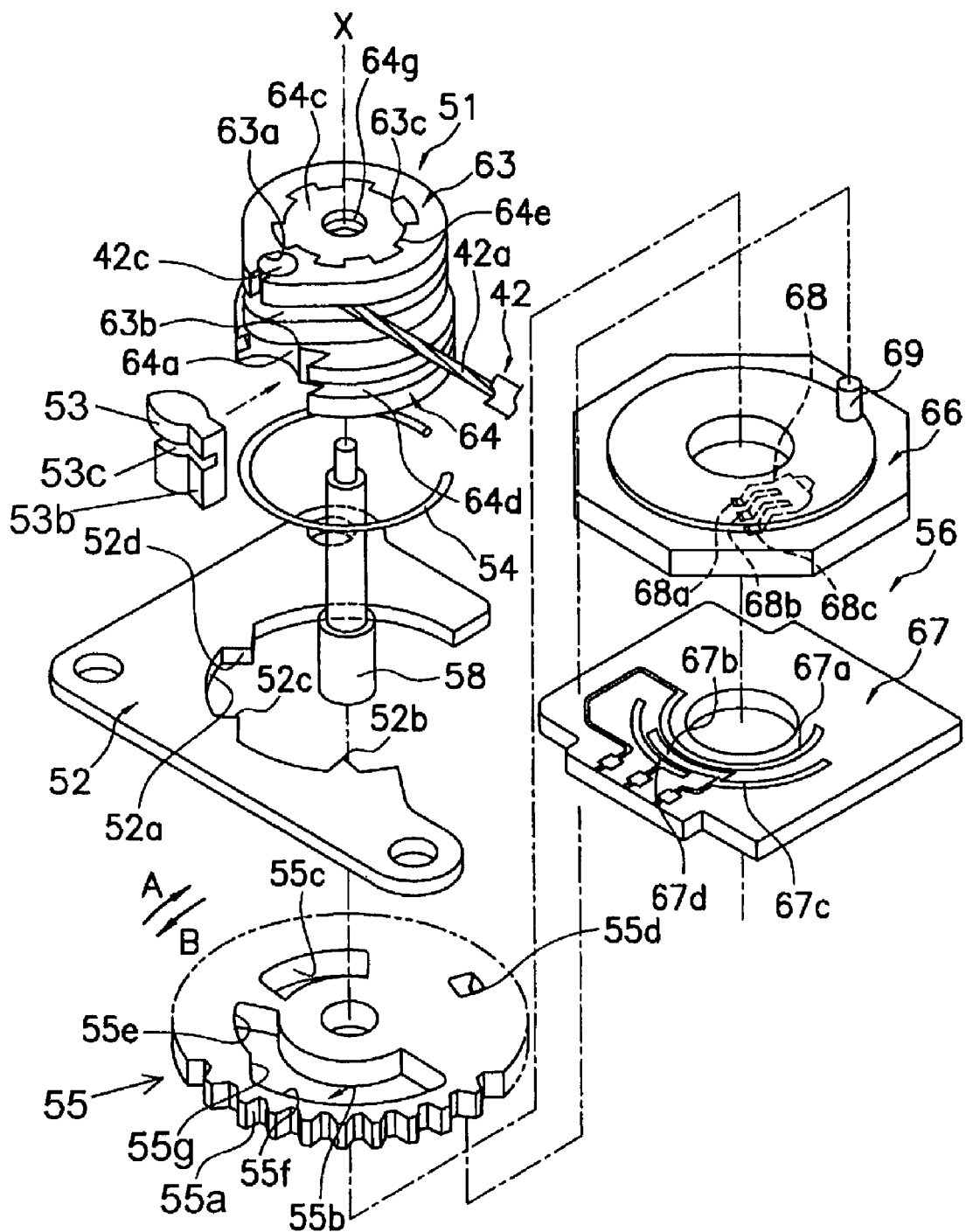
FIG. 8 is an exploded perspective view of the positioning device.

Pawl control member 55 is a disk-shaped metal member having outer peripheral gear teeth 55a that engage the electric drive mechanism 57. Pawl control member 55 is rotatably mounted on the rotational spindle 58 coaxially with the winding body 51. As shown in FIG. 8, formed on the side surface of pawl control member 55 are a pawl control aperture 55b for controlling the movement of pawl 53 between the positioning member engaging position and the positioning member disengaging position; an arcuate interlocking aperture 55c for engaging interlocking pin 64h of pawl mounting member 64; and a locking hole 55d for engaging a locking pin 69 of a positioning sensor 56.

Pawl control aperture 55b is an arcuate aperture having a small-diameter aperture portion 55e and a large-diameter aperture portion 55f disposed upstream of the small-diameter aperture portion 55e in the cable winding direction A. A pawl control surface including an inclined surface 55g is formed between the small-diameter aperture portion 55e and the large-diameter aperture portion 55f. When the tip 53a of pawl member 53 is disposed in the small-diameter aperture portion 55e, then pawl member 53 is maintained in the positioning member disengaging position. When the tip 53a of pawl member 53 is disposed in the large-diameter aperture portion 55f, then pawl member 53 is allowed to move toward the positioning member engaging position. Accordingly, when pawl control member 55 rotates in the cable unwinding direction B relative to pawl mounting member 64 and the inclined surface 55g passes the tip 53a of the pawl member 53, pawl member 53 is forced into the positioning member disengaging position, and winding body 51 is allowed to rotate in the cable unwinding direction B as a result of the biasing force of inner cable 42a of shift control cable 42. On the other hand, when pawl control member 55 rotates in the cable unwinding direction A relative to pawl mounting member 64 and the inclined surface 55g moves past the tip 53a of the pawl member 53, then pawl member 53 is allowed to rotate back into the positioning member engaging position in accordance with the biasing force of spring 54.

The interlocking aperture 55c is an arcuate aperture which engages interlocking pin 64h so that pawl control member 55 may rotate winding body 51 in the cable winding direction A in a manner discussed below. Since winding body 51 normally is biased in the cable unwinding direction B by the inner cable 42a of shift control cable 42, the interlocking pin 64h normally contacts the left edge of the interlocking aperture 55c. The length of the interlocking aperture 55c in the circumferential direction is greater than the circumferential gap between the protrusions 52b.

The position detector 56 is placed between the pawl control member 55 and the bottom of the first case member 60. Position detector 56 includes a rotating position member 66 and a fixed position member 67, wherein fixed position member 67 is secured to first case member 60. A brush 68 is mounted on the surface of rotating position member 66 facing the fixed position member 67, and the locking pin 69 is mounted on the surface of rotating position member 66 facing the pawl control member 55. The brush 68 has three mutually conductive and parallel brush contacts 68a, 68b, and 68c. The brush 68 elastically contacts the fixed position member 67 and provides a mild braking force to rotating position member 66 and hence to pawl control member 55.

Locking pin 69 of rotating position member 66 engages locking hole 55d in pawl control member 55 so that rotating position member 66 and pawl control member 55 rotate as a unit. The length of the locking hole 55d in the rotational direction is slightly greater than the diameter of the locking pin 69. Therefore, some play (gap) is formed in the rotational direction between the locking hole 55d and the locking pin 69. The presence of such play together with the braking force provided by brush 68 allows the rotating position member 66 to start rotating slightly later than the pawl control member 55. In other words, when the pawl control member 55 rotates in the cable winding direction A, for example, the pawl control member 55 precedes the rotating position member 66, and an overrun of pawl control member 55 is created by the delay before position detector 56 detects the next position. This overrun causes an overstroke of inner cable 42a when the cable is wound. That is, the inner cable 42a is wound slightly farther than the distance necessary to shift speeds. This overstroke is used in a known manner to compensate for loose machine elements, gear resistance, errors in production, and so on.

The fixed position member 67 has a conductive trace forming four fixed contacts 67a–67d that are formed into arcuate shapes of different lengths for contacting the three brush contacts 68a–68c. The radially innermost fixed contact 67a is used for grounding and arcuately extends the full rotational range of the pawl control member 55. Fixed contact 67a thus continuously contacts brush contact 68a. The fixed contact 67b is located radially outwardly from the fixed contact 67a for contacting brush contact 68b when rotating position member 66 is in a position corresponding to a middle speed position. Fixed contact 67c is located radially outwardly from fixed contact 67b, but it is electrically connected to the fixed contact 67b. Fixed contact 67c contacts brush contact 68c when rotating position member 66 is in a position corresponding to a low speed position. Fixed contact 67d is located at the same radial distance as fixed contact 67c, and it contacts brush contact 68c when rotating position member 66 is in a position corresponding to a high speed position.

Figure 6:
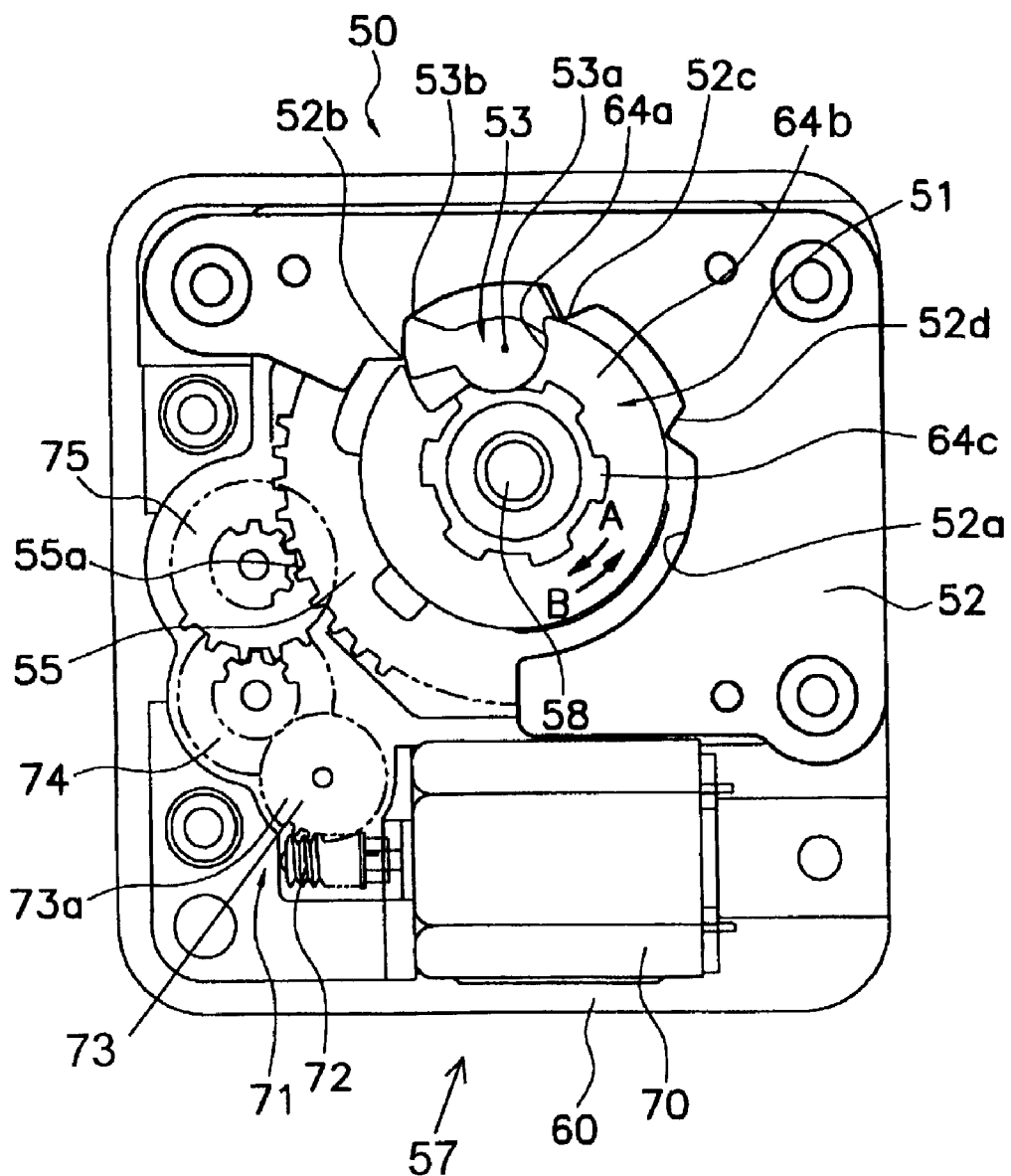
FIG. 6 is a plan view of a positioning unit with the second case member open.
Figure 7:
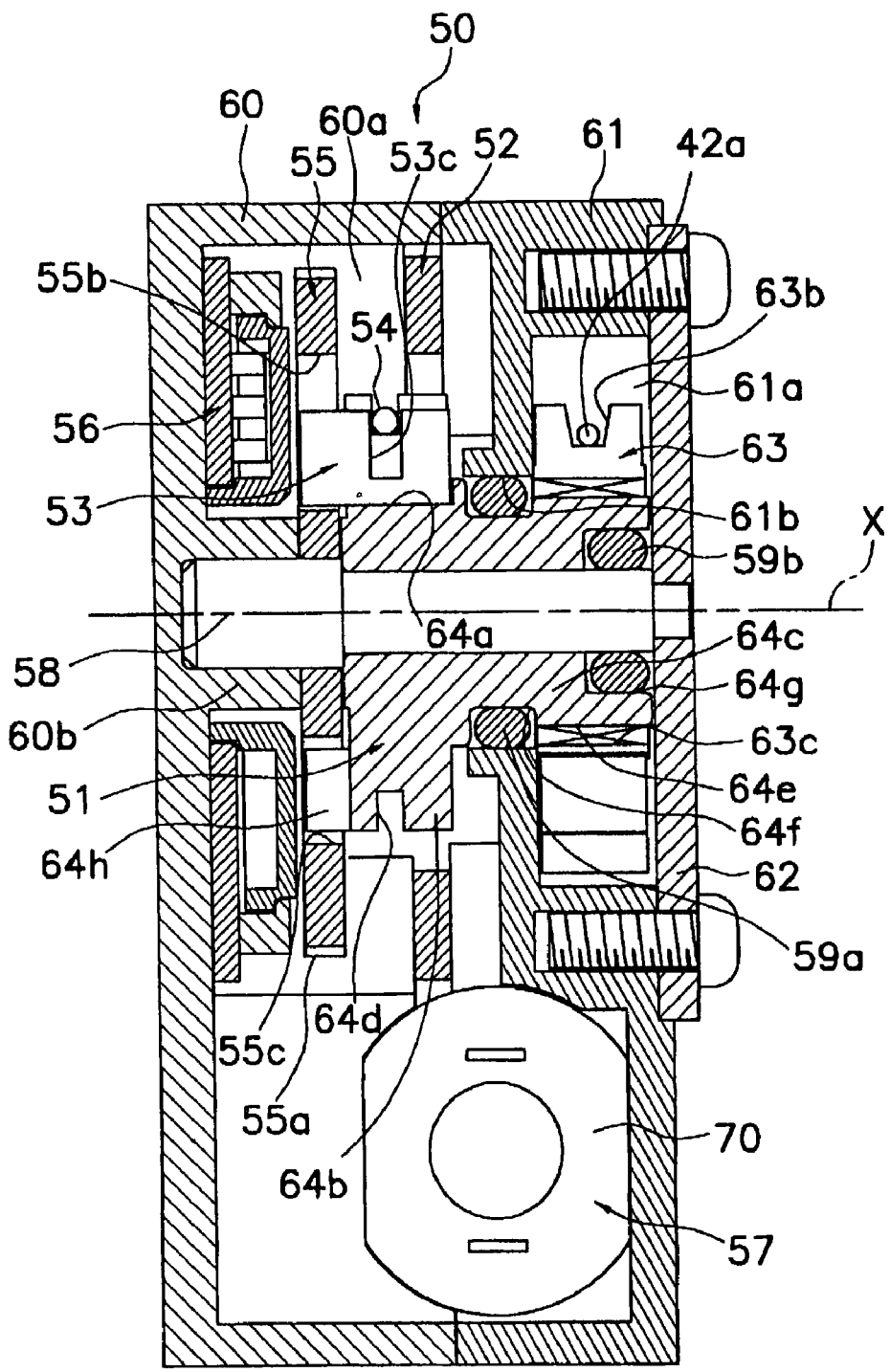
FIG. 7 is a view taken along line VII—VII of FIG. 5.

As shown in FIG. 6, the electric drive mechanism 57 comprises an electric motor 70 (e.g., a DC motor) and a gear reduction mechanism 71 for reducing the rate of rotation of pawl control member 55 relative to electric motor 70 (e.g., to about 1/1500 of the rotation of electric motor 70). The gear reduction mechanism 71 includes a worm gear 72 fixed to the output spindle of the electric motor 70; a first reduction gear 73 with a worm wheel 73a for engaging the worm gear 72; a second reduction gear 74 for engaging the first reduction gear 73; and a third reduction gear 75 for engaging the second reduction gear 74. The reduction gears typically have a large-diameter gear and a small-diameter gear, and rotational speed is reduced whenever the small-diameter gear engages the large-diameter gear of another reduction gear. The small-diameter gear of the third reduction gear 75 engages the external peripheral gear 55a of the pawl control member 55 in the power transmitting direction.

Figure 9:
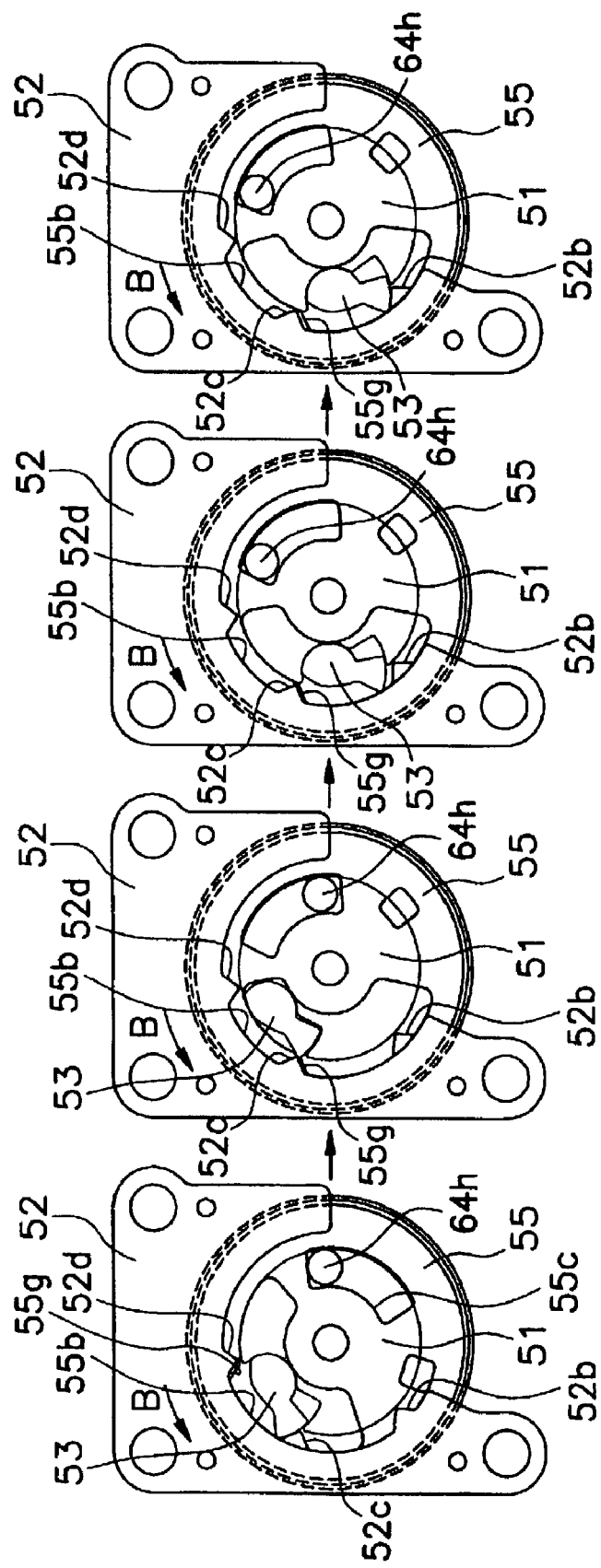
FIGS. 9(A)–9(D) are diagrams illustrating the manner in which the positioning device is moved in a downshifting direction.

The operation of positioning unit 29 when shifting from a higher speed position to a lower speed position is shown in FIGS. 9(A)–9(D). Assume winding body 51 is in the middle speed position shown in FIG. 9(A), and it is desired to shift to the low speed position. Current is supplied to motor 70 so that pawl control member 55 rotates in the cable unwinding direction B. When pawl control member 55 rotates in the cable unwinding direction B, the interlocking pin 64h pulls away from the left edge of the interlocking aperture 55c, and the inclined surface 55g of the pawl control member 55 comes into contact with the pawl member 53. Then, pawl member 53 is forced into a positioning member disengaging position as shown in FIG. 9(B), and winding body 51 rotates in the cable unwinding direction B because of the biasing force of the inner cable 42a of shift control cable 42 as shown in FIG. 9(C). When pawl member 53 moves past the inclined surface 55g of pawl control aperture 55b and again is positioned in the large-diameter aperture 55f, the spring 54 causes pawl member 53 to move into the positioning member engaging position, and winding member 51 is locked in the low speed position by the protrusion 52b as shown in FIG. 9(D) to complete the downshifting operation. The operation is the same when the speed is shifted from the high speed step to the middle speed step.

The operation of positioning unit 29 when shifting from a lower speed position to a higher speed position is shown in FIGS. 10(A)–10(D). Assume winding body 51 is in the low speed position shown in FIG. 10(A), and it is desired to shift to the middle speed position. Current is supplied to motor 70 so that pawl control member 55 rotates in the cable winding direction A. The left edge of interlocking aperture 55c presses against interlocking pin 64h so that pawl control member 55 and winding member 51 rotate as a unit as shown in FIG. 10(B). When pawl member 53 contacts protrusion 52c, pawl member 53 rotates counterclockwise and rides over the tip of protrusion 52c as shown in FIG. 10(B). As noted previously, there is play between the locking pin 69 in the position detector 56 and the locking hole 55d of the pawl control member 55. Thus, pawl control member 55 rotates more than the required amount before position detector 56 detects the middle speed position as shown in FIG. 10(C). This causes an overstroke of inner cable 42a of shift control cable 42 as noted previously. When current is removed from motor 70, electric motor 70 rotates slightly in the cable unwinding direction B, and pawl member 53 engages the protrusion 52c to complete the upshifting operation. The operation is the same when the speed is shifted from the middle speed step to the high speed step.

With this structure, the positioning mechanism operates by a pawl member 53 that moves radially inwardly and outwardly. This eliminates the need for a space to accommodate axial movement of a positioning mechanism as in the prior art, not to mention the biasing mechanism for the positioning mechanism. This makes it possible to design a flatter shifter positioning device.

Figure 11:
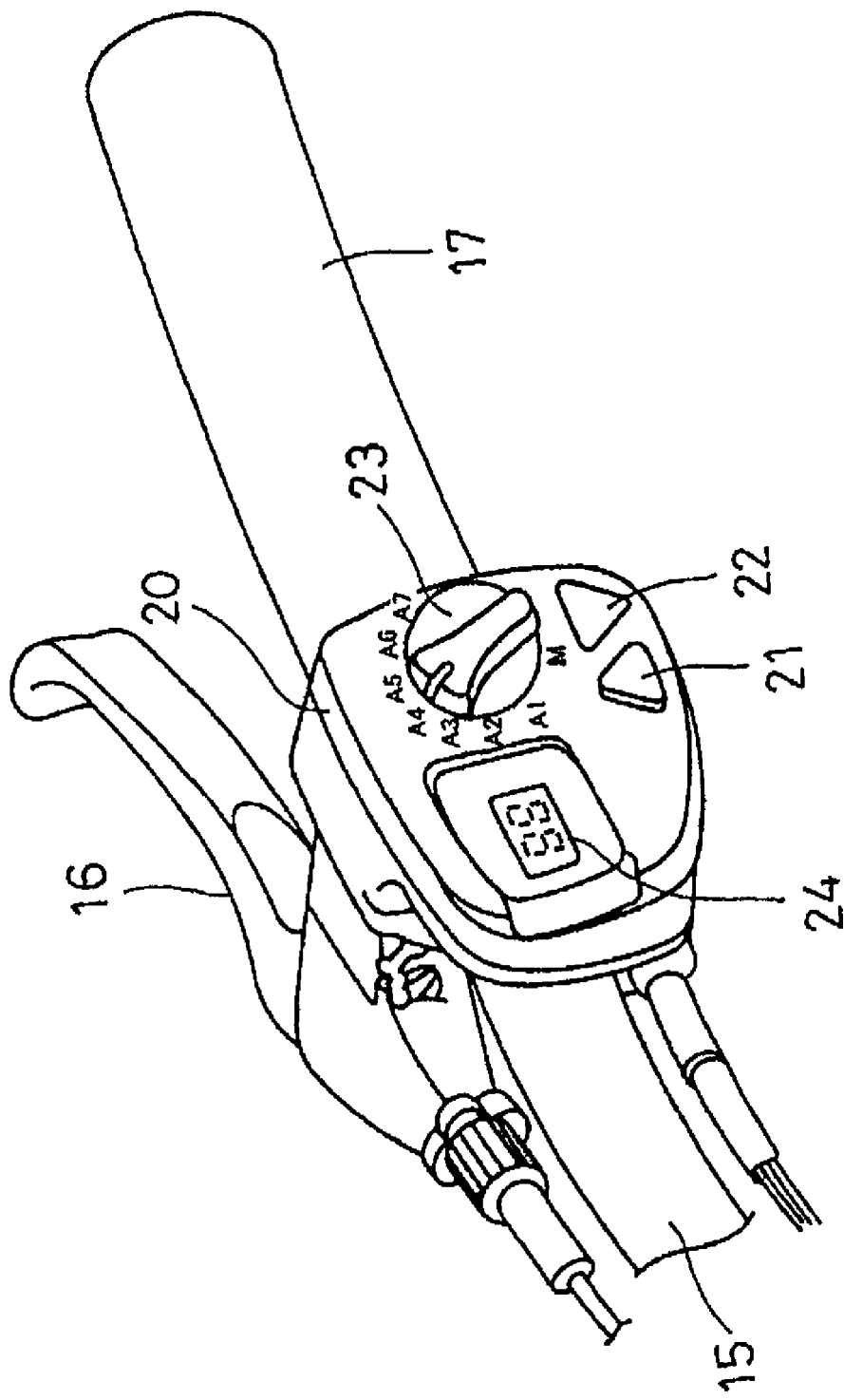
FIG. 11 is a perspective view of the shift controller.

As shown in FIG. 11, the shift controller 20 comprises two operating buttons 21 and 22 in the form of triangular pushbuttons disposed next to each other, an operating dial 23 disposed above the operating buttons 21 and 22, and a liquid crystal display component 24 disposed to the left of the operating dial 23. The operating button 21 on the left side is for manually shifting from the low speed step to the intermediate speed step and to the high speed step. The operating button 22 on the right side is for manually shifting from the high speed step to the intermediate speed step and to the low speed step. The operating dial 23 is used for switching between a manual mode (M) and seven automatic shifting modes (A1–A7) using eight detent positions.

The seven automatic shifting modes A1–A7 are modes for automatically shifting the internal shifting hub 10 according to a bicycle speed signal derived from the alternating current generator 19 in a manner described below. The seven automatic shifting modes are designed to allow shift timing (i.e., the speed at which shifting will occur) to be automatically changed during upshifting (shifting from low speed to high speed) or downshifting (shifting from high speed to low speed). The shift timings for the various modes are shown in FIG. 12. The upward and downward shift timings gradually decrease from mode 1 through mode 7 such that mode 1 shifts at the highest speed, and mode 7 shifts at the lowest speed. It is usually preferable to set the shift controller to about mode 4. For climbing hills, a mode may be set according to the steepness of the hill. When automatic shifting mode 4 is selected, for example, the hub is upshifted from speed 1 to speed 2 when the bicycle speed reaches 12.7 km/h. Similarly, the hub is upshifted to speed 3 when the bicycle speed reaches 17.1 km/h. On the other hand, when the bicycle speed later falls to 15.6 km/h, the hub is downshifted to speed 2, and again downshifted to speed 1 when the bicycle speed falls to 11.5 km/h. Between upshift timing and downshift timing, downshift timing is set as the lower of the two to prevent chattering during shifting.

Figure 13:
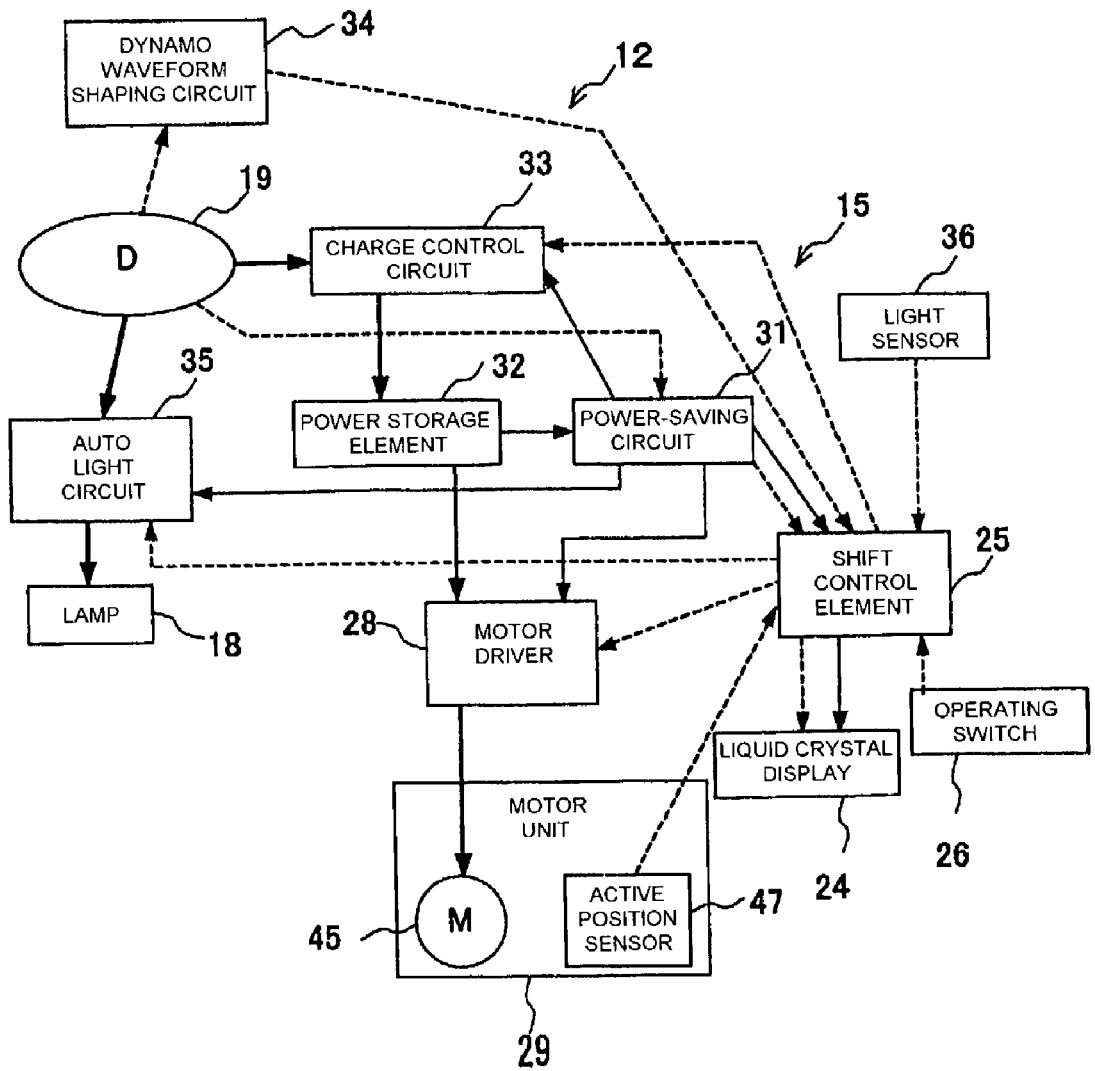
FIG. 13 is a schematic block diagram of the shift control device.

FIG. 13 is a block diagram illustrating the structure of the shift control device. Heavy lines in FIG. 13 indicate lines carrying about 1 A of current, solid lines indicate lines carrying about 5 mA of current, and dotted lines indicate signal lines. Shift control element 25 is operatively coupled to an operating switch 26 (which schematically represents the operating dial 23 and operating buttons 21 and 22 in the shift controller 20), to the liquid crystal display component 24, to a light sensor 36 (illumination sensor) for controlling the lamp 18, to a dynamo waveform shaping circuit 34 that generates a speed signal derived from the output of the alternating current generator 19, to a motor driver 28, to the active position sensor 47 of the motor unit 29, and to other input/output components.

Shift control element 25 automatically controls shifting of the internal shifting hub 10 according to travel speed, and it controls the information displayed on the liquid crystal display component 24 disposed in the shift controller 20. In this embodiment, the current travel speed and the speed step activated during shifting are displayed together on the liquid crystal display component 24. The shift control element 25 also controls the lamp 18 by turning it on when surrounding light conditions fall below a certain prescribed brightness, and by turning it off when surrounding light conditions are above the prescribed brightness.

A charge control circuit 33, a power storage element 32, and an auto light circuit 35 are operatively coupled to the shift control element 25 via a power-saving circuit 31. A signal from the alternating current generator 19 is input to the power-saving circuit 31, and it is determined based on this signal whether or not the bicycle is stopped. The power saving circuit 31 supplies the shift control element 25, the motor driver 28, the charge control circuit 33 and the auto light circuit 35 with electrical power stored by the power storage element 32 when the bicycle is moving for the normal operation of these components, and it interrupts the supply of electrical power to these components when the bicycle is stopped to avoid needless expenditure of electrical power stored by the power storage element 32. Motor driver 28 operates on a 1 mA current supplied by the power-saving circuit 31, and it controls a 1A current supplied by the power storage element 32 to operate the shifting motor 45.

The charge control circuit 33 comprises, for example, a half-wave rectifier circuit that rectifies an alternating current output from the alternating current generator 19 to, for example, 1A and 5 mA direct currents. The power storage element 32 comprises, for example, a high-capacity capacitor that stores the direct current power that is output from the charge control circuit 33. The power storage element 32 also may comprise secondary batteries such as nickel cadmium batteries, lithium ion batteries, nickel-metal hydride batteries, etc., in lieu of a capacitor.

The dynamo waveform shaping circuit 34 forms a speed signal from the alternating current output from the alternating current generator 19. More specifically, a half-cycle is extracted from a sine wave alternating current signal, passed through a Schmitt circuit or other appropriate waveform shaping circuit, and formed into a pulse signal corresponding to speed. Shift control element 25 uses this signal to control the automatic shifting of the internal shifting hub 10.

The auto light circuit 35 supplies or interrupts the 1A current output from the alternating current generator 19 to the lamp 18 in response to on/off signal output from the shift control element 25. Shift control element 25 generates these signal based on the signals from the light sensor 36 in such a manner that the lamp 18 is switched on automatically when light levels fall below a prescribed limit, and it is switched off when light levels exceed the prescribed limit. In this embodiment, lamp 18 is operated from the alternating current generator 19 so that the current draw is less apt to adversely affect the power storage element 32, but this is not necessary.

Battery replacement and recharging are unnecessary because the power storage element 32 stores electrical power from the alternating current generator 19, and components such as the shift control element 25 are operated using this electrical power. Monitoring remaining battery power and carrying along spare batteries also become unnecessary, and shifting can be done automatically without performing the cumbersome procedures required by conventional power sources. The electrical power from the alternating current generator 19, which conventionally is not employed in the daytime, can be put to effective use in the shift control unit 12.

In addition, bicycle speed is detected based on the alternating current signal output from the alternating current generator 19, and shifting is controlled according to the detected bicycle speed. Because alternating current generators generally have a plurality of circumferentially disposed magnetic poles, the alternating current generator outputs an alternating current signal with a frequency related to the bicycle speed and the number of magnetic poles. Consequently, it is possible to obtain a larger number of signal pulses from the alternating current signal during each wheel rotation in comparison with a speed signal obtainable, for example, from a conventional speed sensor that detects a magnet mounted to the bicycle wheel. Therefore, the bicycle speed can be accurately detected within the space of one wheel rotation, and shifting can be controlled in real time with high precision. Furthermore, since shifting is controlled based on the alternating current signal from the alternating current generator 19, it is no longer necessary to dispose the shift control unit 12 in the vicinity of the bicycle wheel. No limitation is placed on the mounting position of the shift control unit 12.

The ability to make a flatter positioning unit 29 allows the entire automatic shifting device to be made more compact and light weight, and the positioning unit 29 may be placed parallel with the circuit unit 30 inside the lamp case 13.

Electric power from the alternating current generator 19 can be used as a power source for the circuit unit 30 and the electric motor 70.

Figure 14:
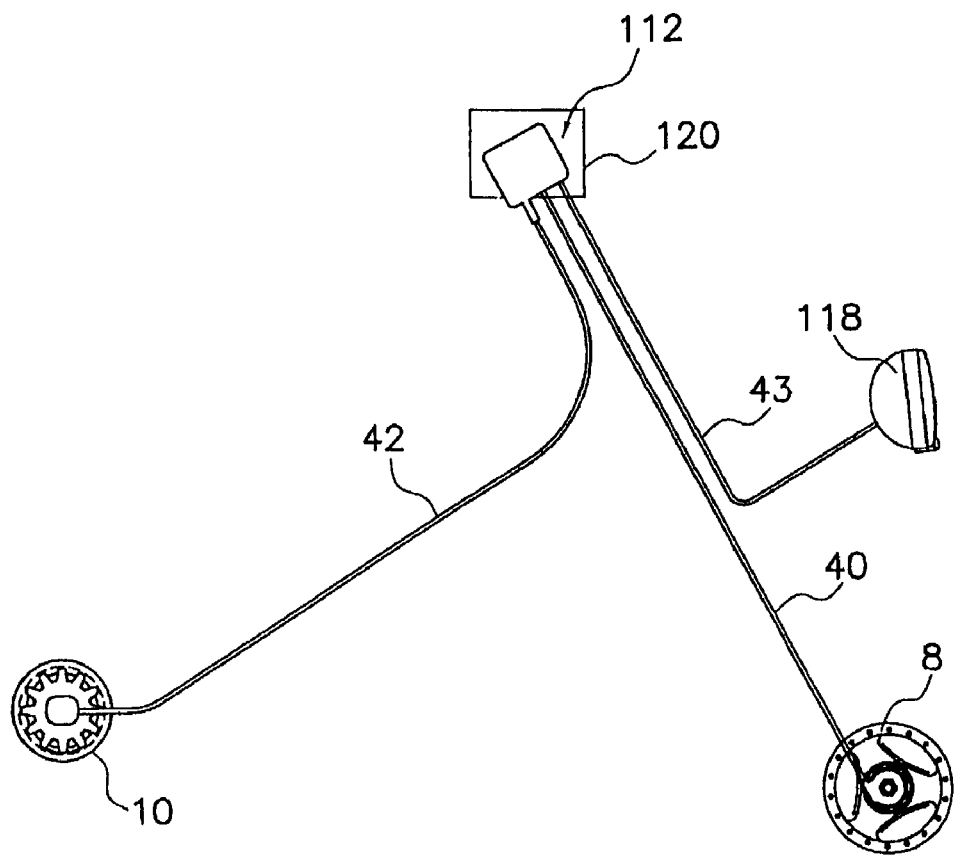
FIG. 14 illustrates how the shift controller, the shift control unit, the generator and the transmission are coupled together in another embodiment of the present invention.
Figure 15:
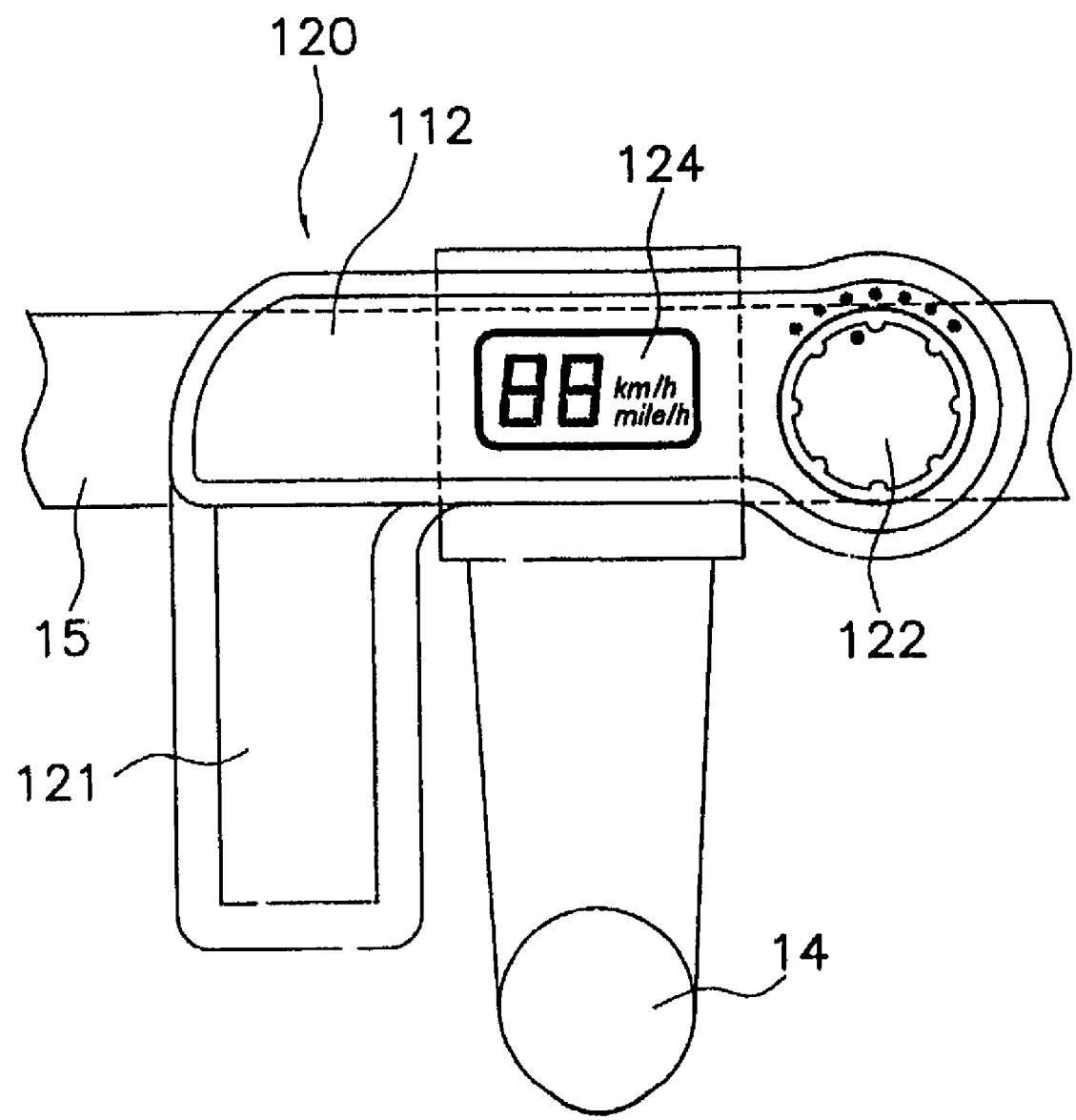
FIG. 15 is a plan view of the shift controller and shift control unit shown in FIG. 14.
Figure 16:
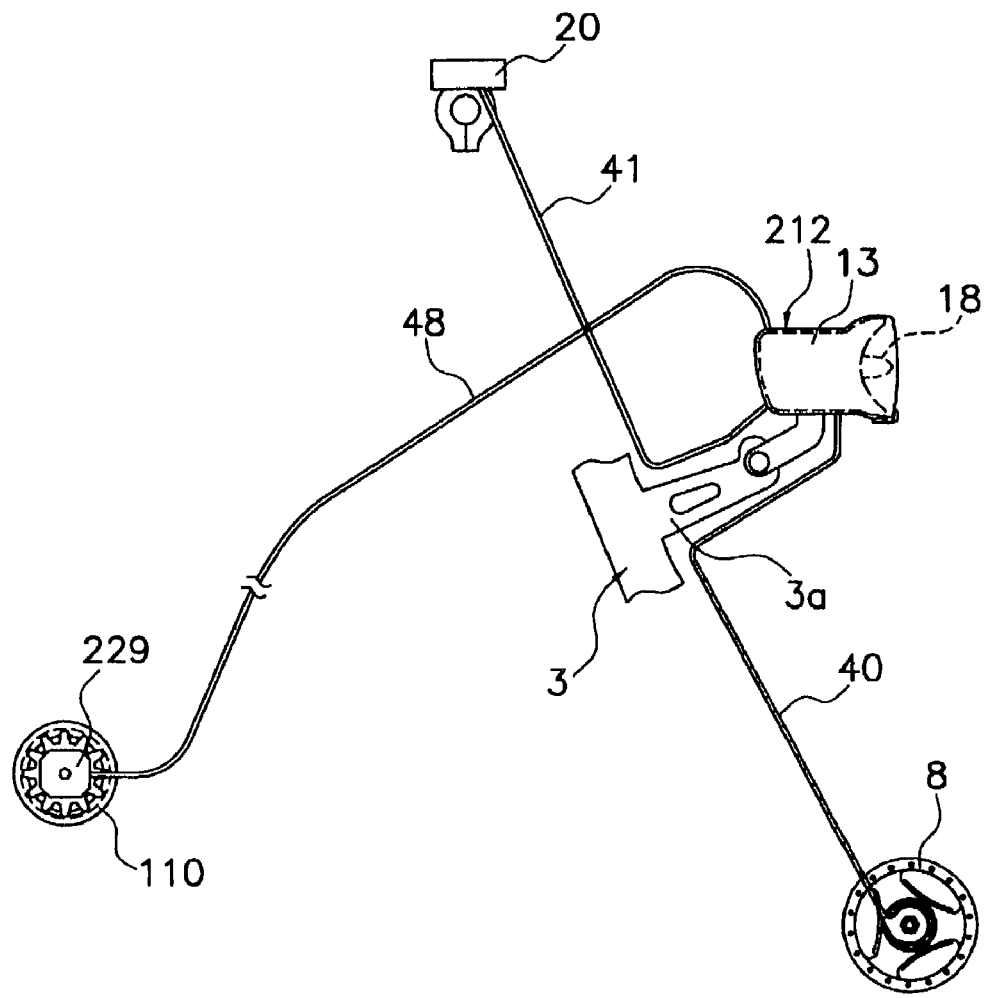
FIG. 16 illustrates how the shift controller, the shift control unit, the generator and the transmission are coupled together in another embodiment of the present invention.

While the above is a description of various embodiments of the present invention, further modifications may be employed without departing from the spirit and scope of the present invention. For example, the shift control unit 12 in the above embodiment was constructed using the lamp case 13, but as depicted in FIGS. 14 and 15, a shift control unit 112 may also be constructed using a case 121 of a shift controller 120. In this instance, a lamp 118 and shift control unit 112 may be connected using electrical wiring 43. In this embodiment, the case 121 is mounted on handlebar 15 in the vicinity of the handle stem 14, and a display component 124 and an operating dial 122 are positioned such that they are exposed to the outside. Circuit units and motor units are housed internally. In this embodiment, a currently existing lamp can be used as the lamp 118, and a unit for automatic shifting can be mounted as a modification to an existing three speed bicycle.

Figure 10:
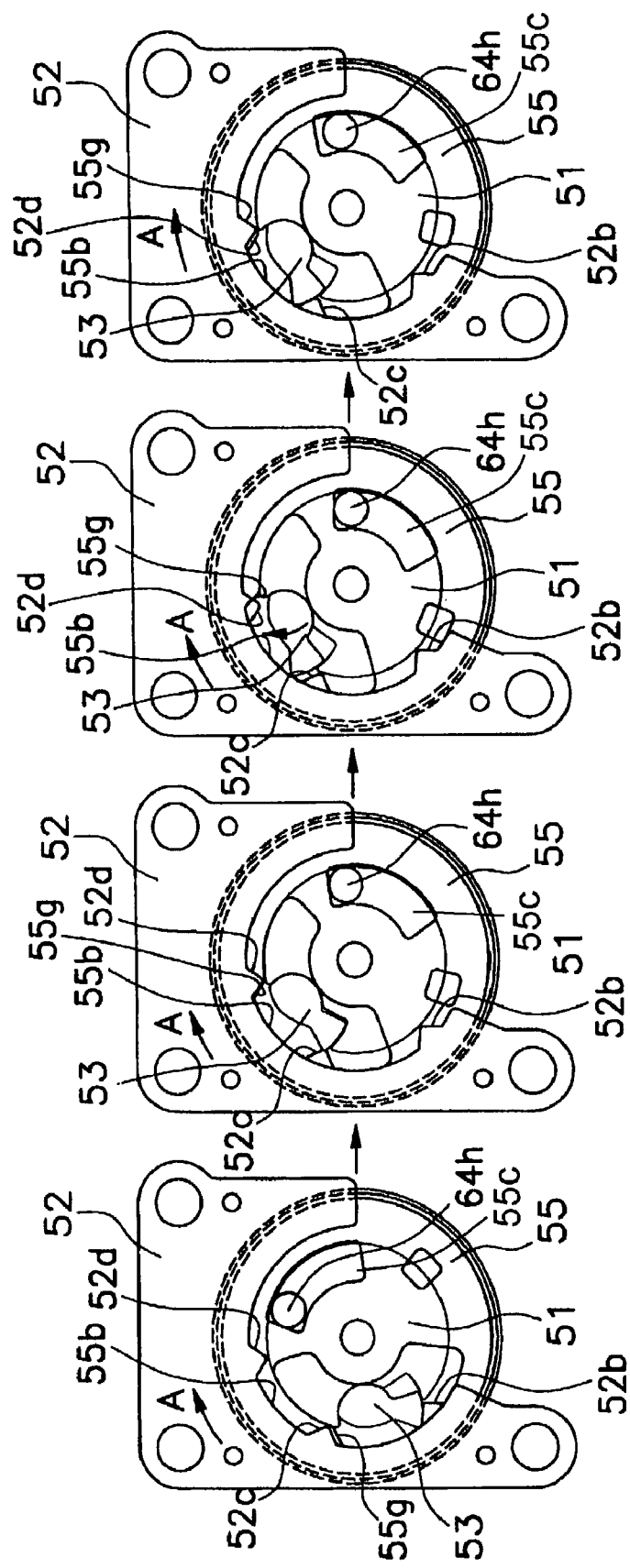
FIGS. 10(A)–10(D) are diagrams illustrating the manner in which the positioning device is moved in an upshifting direction.

A positioning unit 29 for shifting was placed within the shift control unit in the aforementioned embodiments. However, if desired a positioning unit 229 that includes a motor for speed shifting, a position detector, or the like may be placed next to a speed shifting device 110 as shown in FIG. 10. In such a case, the shift control element 212 and the shifting device 110 may be connected merely by using electrical wiring 48 rather than a shift control cable.

An internal shifting hub was controllably shifted in the aforementioned embodiments, but the shifting device need not be mounted internally. The shifting device could comprise a derailleur, such as a front and/or rear derailleur. If desired, two motor units may be used for controlling each derailleur.

In the previous embodiments, a shift control cable was shown as an example of a connection between the shift control unit and the hub 10, but a link or some other such configuration also may be used.

Figure 17:
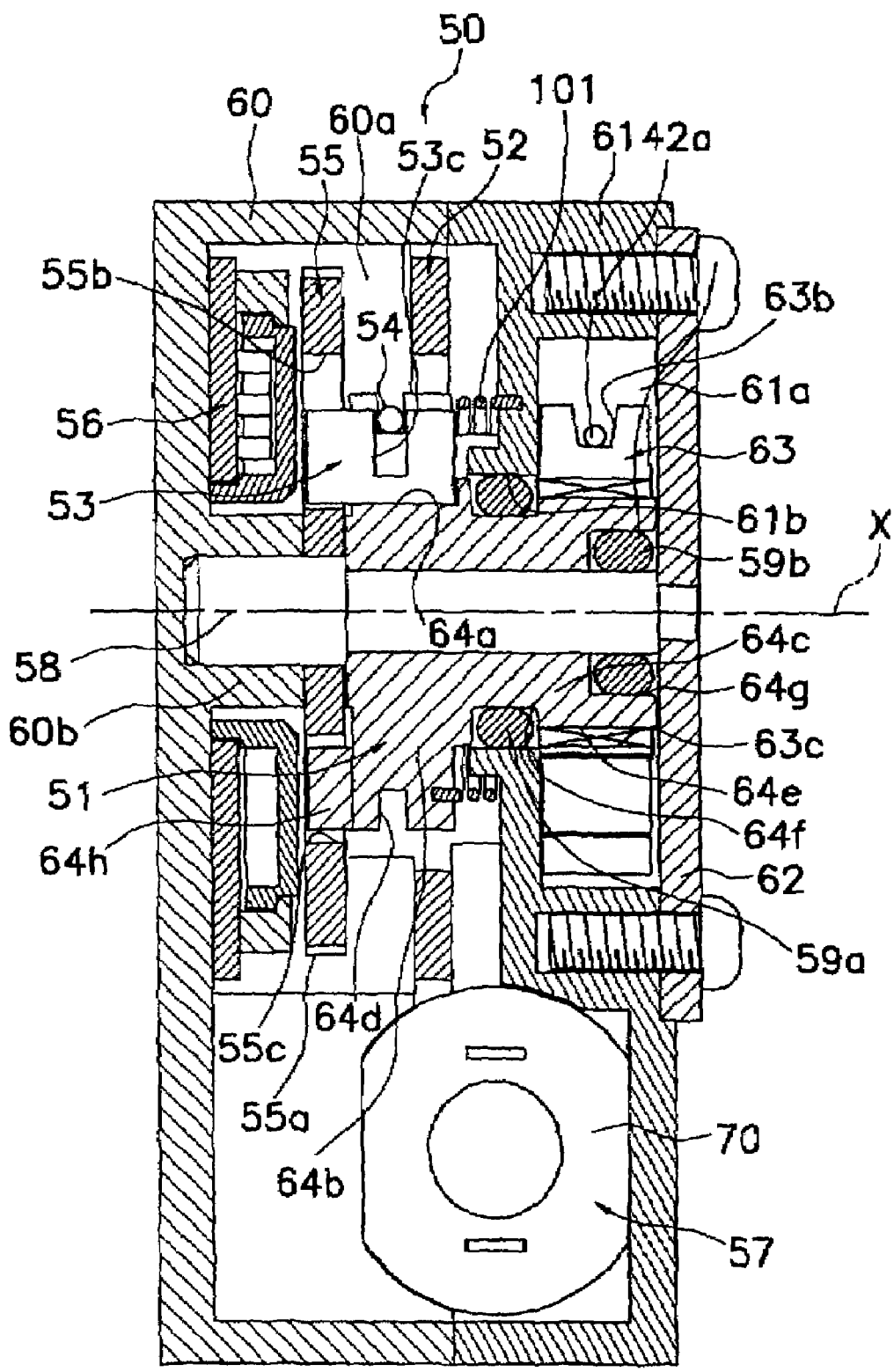
FIG. 17 is a view corresponding to the view taken along line VII—VII of FIG. 5 for another embodiment of a positioning device.

In the previous embodiments, the winding body 51 is biased in the cable unwinding direction via the shifter cable 42. However, the winding body 51 may be biased in the cable unwinding direction by a biasing mechanism such as a torsional coil return spring 101, for example, as shown in FIG. 17. In this arrangement, one end of the coil return spring 101 is attached at the side of the large-diameter portion 64b of the pawl mounting member 64 of the winding body 51, and the other end of the coil return spring 101 is attached to the bottom of the second case member 60.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle shift positioning device comprising:
    a base member adapted to be mounted to a bicycle;
    a first rotating body rotatably mounted relative to the base member;
    a second rotating body rotatably mounted relative to the first rotating body;
    a positioning member nonrotatably coupled relative to the base member and having a plurality of positioning elements;
    a pawl that moves between a positioning member engaging position and a positioning member disengaging position, wherein the pawl is coupled so that the pawl moves when the first rotating body moves during a gear shift operation of the shift control device, wherein such movement of the pawl is independent of rotation of the second rotating body and is movement other than movement of the pawl between the positioning member engaging position and the positioning member disengaging position;
    a pawl control element coupled for movement with the second rotating body;
    a pawl biasing mechanism for biasing the pawl toward the positioning member engaging position; and
    wherein the pawl control element allows the pawl to move toward the positioning member engaging position when the first rotating body is in a first rotational position relative to the second rotating body, and wherein the pawl control element causes the pawl to be in the positioning member disengaging position when the first rotating body is in a second rotational position relative to the second rotating body.

2. The device according to claim 1 wherein the first rotating body rotates coaxially with the second rotating body.

3. The device according to claim 1 wherein the first rotating body includes a cable winding groove.

4. The device according to claim 1 wherein the pawl control element comprises a pawl control surface for moving the pawl toward the positioning member engaging position and toward the positioning member disengaging position.

5. The device according to claim 1 wherein the plurality of positioning elements are disposed radially outwardly from the first rotating member.

6. The device according to claim 5 wherein the plurality of positioning elements are circumferentially disposed relative to the first rotating member.

7. The device according to claim 6 wherein each of the plurality of positioning elements comprises a protrusion that extends radially inwardly.

8. The device according to claim 1 wherein the first rotating body rotates around a rotational axis, and wherein the pawl moves radially with respect to the rotational axis between the positioning member engaging position and a positioning member disengaging position.

9. The device according to claim 1 wherein the second rotating body is coupled for rotating the first rotating body.

10. The device according to claim 9 wherein the pawl control element allows the pawl to move toward the positioning member engaging position when the pawl control element rotates in a first direction relative to the first rotating body.

11. The device according to claim 9 further comprising a drive mechanism for rotating the second rotating body.

12. The device according to claim 11 wherein the drive mechanism comprises an electric motor.

13. The device according to claim 9 further comprising a position detector for detecting a position of the second rotating body.

14. The device according to claim 13 wherein the position detector comprises:
a rotating position member that rotates with the second rotating body;
a fixed position member;
a brush disposed on one of the rotating position member and the fixed position member; and
a conductive trace disposed on the other one of the rotating position member and the fixed position member.

15. A bicycle shift positioning device comprising:
a base member adapted to be mounted to a bicycle;
a first rotating body rotatably mounted relative to the base member;
a second rotating body rotatably mounted relative to the first rotating body;
wherein the second rotating body is coupled for rotating the first rotating body;
a positioning member coupled to the base member and having a plurality of positioning elements;
a pawl coupled for movement with the first rotating body, wherein the pawl moves between a positioning member engaging position and a positioning member disengaging position;
a pawl control element coupled for movement with the second rotating body;
a pawl biasing mechanism for biasing the pawl toward the positioning member engaging position;
wherein the pawl control element allows the pawl to move toward the positioning member engaging position when the first rotating body is in a first rotational position relative to the second rotating body, and wherein the pawl control element causes the pawl to be in the positioning member disengaging position when the first rotating body is in a second rotational position relative to the second rotating body;
wherein the pawl control element allows the pawl to move toward the positioning member engaging position when the pawl control element rotates in a first direction relative to the first rotating body; and
wherein the pawl control element causes the pawl to move toward the positioning member disengaging position when the pawl control element rotates in a second direction relative to the first rotating body, wherein the second direction is opposite the first direction.

16. The device according to claim 15 further comprising a first rotating body biasing mechanism for biasing the first rotating body in the second direction.

17. The device according to claim 16 wherein the first rotating body biasing mechanism comprises a shift control cable.

18. The device according to claim 17 wherein the shift control cable winds around the first rotating body when the first rotating body rotates in the first direction.

19. The device according to claim 18 wherein the first rotating body and the second rotating body rotate around a common rotational axis.

20. The device according to claim 19 wherein the pawl moves radially with respect to the rotational axis between the positioning member engaging position and a positioning member disengaging position.

21. The device according to claim 19 wherein the first rotating body comprises a cable locking member that locks the shift control cable.

22. The device according to claim 21 wherein the first rotating body includes a cylindrical pawl supporting element, wherein the pawl is rotatably supported by the pawl supporting element.

23. The device according to claim 22 further comprising a pawl spring biasing the pawl toward the positioning member engaging position.

24. A bicycle shift positioning device comprising:
a base member adapted to be mounted to a bicycle;
a first rotating body rotatably mounted relative to the base member;
a second rotating body rotatably mounted relative to the first rotating body;
wherein the second rotating body is coupled for rotating the first rotating body;
a positioning member coupled to the base member and having a plurality of positioning elements;
a pawl coupled for movement with the first rotating body, wherein the pawl moves between a positioning member engaging position and a positioning member disengaging position;
a pawl control element coupled for movement with the second rotating body;
a pawl biasing mechanism for biasing the pawl toward the positioning member engaging position;
wherein the pawl control element allows the pawl to move toward the positioning member engaging position when the first rotating body is in a first rotational position relative to the second rotating body, and wherein the pawl control element causes the pawl to be in the positioning member disengaging position when the first rotating body is in a second rotational position relative to the second rotating body;
a position detector for detecting a position of the second rotating body, wherein the position detector comprises:
a rotating position member that rotates with the second rotating body;
a fixed position member;
a brush disposed on one of the rotating position member and the fixed position member;
a conductive trace disposed on the other one of the rotating position member and the fixed position member; and
wherein the brush contacts the conductive trace to provide a braking force to the second rotating body.

25. The device according to claim 24 wherein the rotating position member is interlocked with the second rotating body with sufficient play that the second rotating body rotates a selected amount without rotating the rotating position member.

26. The device according to claim 25 wherein one of the rotating position member and the second rotating body includes a projection that extends into an aperture formed in the other one of the rotating position member and the second rotating body.

* * * * *